United States Patent
Forster

(10) Patent No.: US 7,239,287 B2
(45) Date of Patent: Jul. 3, 2007

(54) WIRELESS COMMUNICATION DEVICE HAVING CONDUCTIVE ELEMENTS ANTENNA

(75) Inventor: Ian J. Forster, Essex (GB)

(73) Assignee: Mineral Lassen LLC, Las Vegas, NV (US)

( * ) Notice: Subject to any disclaimer, the term of this patent is extended or adjusted under 35 U.S.C. 154(b) by 746 days.

(21) Appl. No.: 10/422,637

(22) Filed: Apr. 24, 2003

(65) Prior Publication Data

US 2004/0036572 A1   Feb. 26, 2004

Related U.S. Application Data

(60) Provisional application No. 60/375,248, filed on Apr. 24, 2002.

(51) Int. Cl.
   *H01Q 9/28* (2006.01)
(52) U.S. Cl. ............... 343/795; 343/795; 343/793; 343/702
(58) Field of Classification Search ........... 343/793, 343/795, 711, 717, 873, 702
   See application file for complete search history.

(56) References Cited

U.S. PATENT DOCUMENTS

| | | | |
|---|---|---|---|
| 3,858,220 A | 12/1974 | Arnow | |
| 5,181,975 A | 1/1993 | Pollack et al. | 152/152.1 |
| 5,218,861 A | 6/1993 | Brown et al. | 73/146.5 |
| 5,319,354 A | 6/1994 | Myatt | 340/572 |
| 5,347,280 A | 9/1994 | Schuermann | 342/42 |
| 5,479,171 A | 12/1995 | Schuermann | 342/44 |
| 5,554,242 A | 9/1996 | Brown et al. | 156/111 |
| 5,731,754 A | 3/1998 | Lee, Jr. et al. | 340/447 |
| 5,833,603 A | 11/1998 | Kovacs et al. | 600/317 |
| 5,959,524 A | 9/1999 | Wienand et al. | 338/28 |
| 5,961,215 A | 10/1999 | Lee et al. | 374/178 |
| 5,972,156 A | 10/1999 | Brady et al. | 156/280 |
| 6,016,127 A | 1/2000 | Casciola et al. | 343/731 |
| 6,043,746 A | 3/2000 | Sorrells | 340/572.7 |
| 6,087,930 A | 7/2000 | Kulka et al. | 340/447 |
| 6,130,602 A | 10/2000 | Otoole et al. | 340/10.33 |
| 6,140,146 A * | 10/2000 | Brady et al. | 438/62 |
| 6,140,974 A | 10/2000 | Dalley | 343/806 |
| 6,208,244 B1 | 3/2001 | Wilson et al. | 340/447 |
| 6,257,289 B1 | 7/2001 | Tomita et al. | 152/152.1 |
| 6,272,936 B1 | 8/2001 | Oreper et al. | 73/862.621 |
| 6,278,413 B1 | 8/2001 | Hugh et al. | 343/818 |
| 6,281,794 B1 * | 8/2001 | Duan et al. | 340/572.1 |

(Continued)

FOREIGN PATENT DOCUMENTS

| | | |
|---|---|---|
| DE | 3736803 A | 5/1989 |
| WO | WO9929525 | 6/1999 |
| WO | WO02093685 A | 11/2002 |

*Primary Examiner*—Thuy V. Tran
*Assistant Examiner*—Dieu Hien Duong
(74) *Attorney, Agent, or Firm*—Christensen O'Connor; Johnson Kindness PLLC

(57) ABSTRACT

An antenna coupled to a wireless communication device that is comprised of a series of conductive elements that form a conductor when placed under a force. The conductor is coupled to a wireless communication device to provide an antenna so that the wireless communication device is capable of communicating at an operating frequency defined by the length and construction of the conductor. The wireless communication device, through its communication using the conductor as an antenna, acts as an indicator of force to an interrogation reader when the wireless communication device is capable of communicating to the interrogation reader using the conductor as an antenna.

64 Claims, 12 Drawing Sheets

U.S. PATENT DOCUMENTS

| | | | |
|---|---|---|---|
| 6,285,342 B1 | 9/2001 | Brady et al. | 343/895 |
| 6,299,349 B1 | 10/2001 | Steinel et al. | 374/143 |
| 6,388,567 B1 | 5/2002 | Bohm et al. | 340/442 |
| 6,424,315 B1 | 7/2002 | Glenn et al. | 343/895 |
| 6,429,831 B2 | 8/2002 | Babb | 343/895 |
| 6,463,798 B2 | 10/2002 | Niekerk et al. | 73/146.2 |
| 6,474,380 B1 | 11/2002 | Rensel et al. | 152/152.1 |
| 6,480,110 B2 | 11/2002 | Lee et al. | 340/572.5 |
| 6,630,910 B2 * | 10/2003 | Forster et al. | 343/806 |
| 2001/0020921 A1 | 9/2001 | Weinberger et al. | |
| 2002/0066506 A1 | 6/2002 | Wilson | 152/152 |
| 2002/0075145 A1 | 6/2002 | Hardman et al. | 340/442 |
| 2002/0088517 A1 | 7/2002 | Shimura | 152/152.1 |
| 2002/0093422 A1 | 7/2002 | Shimura | 340/447 |
| 2002/0116992 A1 | 8/2002 | Rickel | 73/146 |
| 2002/0126005 A1 | 9/2002 | Hardman et al. | 340/442 |
| 2002/0140574 A1 | 10/2002 | Starkey et al. | 340/870.16 |
| 2002/0190853 A1 | 12/2002 | Nigon et al. | 340/448 |
| 2003/0005760 A1 | 1/2003 | Bulst et al. | 73/146 |

* cited by examiner

WIRELESS COMMUNICATION DEVICE HAVING CONDUCTIVE ELEMENTS ANTENNA

RELATED APPLICATION

This application claims priority and the benefit of U.S. Provisional Patent Application Ser. No. 60/375,248 filed Apr. 24, 2002, which is incorporated by reference herein in its entirety.

FIELD OF THE INVENTION

The present invention relates to a wireless communication device that is coupled to a plurality of conductive elements that form an antenna when placed under a force.

BACKGROUND OF THE INVENTION

Wireless communication devices are commonly used today to wirelessly communicate information about goods. For example, transponders may be attached to goods during their manufacture, transport and/or distribution to provide information, such as the good's identification number, expiration date, date of manufacture or "born on" date, lot number, and the like. The transponder allows this information to be obtained unobtrusively using wireless communication without slowing down the manufacturing, transportation, and/or distribution process.

Some goods involve environmental factors by design that are critical to their manufacture and/or intended operation. An example of such a good is a vehicle tire. A tire is designed to be placed under pressure to operate properly. Too little pressure can cause a tire to be damaged by the weight of a vehicle supported by the tire. Too much pressure can cause a tire to rupture. Tire pressure must be tested during the manufacturing process to ensure that the tire meets intended design specifications. The tire pressure should also be within a certain pressure limits during use in order to avoid dangerous conditions. Knowledge of the tire pressure during the operation of a vehicle can be used to inform an operator and/or vehicle system that a tire has a dangerous pressure condition. The vehicle may indicate a pressure condition by generating an alarm or warning signal to the operator of the vehicle.

A pressure sensor can be provided in the tire and coupled to the vehicle using a wired connection. However, the tire moves with respect to the vehicle during the vehicle's movement, and a wired connection may be susceptible to damage or a break thereby causing a failure in receiving pressure information from the pressure sensor. A wireless communication device may be more advantageous to place in a tire to communicate tire pressure. A pressure sensor can be coupled to a wireless communication device that is placed inside a tire to wirelessly communicate tire pressure without need for wired connections. However, the additional cost of the wireless communication device in addition to the pressure sensor may be cost prohibitive.

Therefore, an object of the present invention is to provide a wireless communication device that can determine and communicate certain environmental conditions, such as pressure, without the use and added cost of a separate environmental sensor.

SUMMARY OF THE INVENTION

The present invention relates to an antenna coupled to a wireless communication device that is comprised of a series of conductive elements that form a conductor when placed under a force. The conductor is coupled to a wireless communication device to provide an antenna so that the wireless communication device is capable of communicating at an operating frequency defined by the length and construction of the conductor. The wireless communication device, through its communication using the conductor as an antenna, acts as an indicator of force to an interrogation reader since the wireless communication device is not capable of communicating to the interrogation reader unless a force is placed on the series of conductive elements that form the antenna.

In one embodiment, the series of conductive elements are comprised of links that form a link chain. The link chain is coupled to the wireless communication device to form a dipole antenna. The wireless communication device and link chain are also attached to a flexible, resilient material. When a force is applied to the flexible material and/or the link chain, the links in the link chain form conductive connections with each other to form an antenna to be used by the wireless communication device for wireless communication.

In another embodiment, the series of conductive elements are comprised of hollow conductive spheres that join together using shaped links. The shaped links form conductive connections between the hollow conductive spheres when a force is applied to the hollow conductive spheres and/or a flexible material containing the hollow conductive spheres.

In another embodiment, the series of conductive elements are coupled to a wireless communication device that are placed on the inside of a tire to act as a pressure indicator.

In another embodiment, the wireless communication device is coupled to a series of conductive elements that are attached to a load to act as a weight indicator.

In another embodiment, the wireless communication device is coupled to a series of conductive elements that is attached to an axle to act as a rotation speed indicator.

In another embodiment, the wireless communication device is coupled to a tuning ring, and the tuning ring is coupled to a series of conductive elements. The tuning ring acts as a first antenna to allow the wireless communication device to operate at a first operating frequency. The series of conductive elements acts as a second antenna when placed under a force to allow the wireless communication device to operate at a second operating frequency.

In another embodiment, the wireless communication device is coupled to a series of conductive elements that contains a moveable link. The series of conductive elements acts as a first antenna having a first length when the moveable link is not under a force to allow the wireless communication device to operate at a first operating frequency. The series of conductive elements acts as a second antenna having a second length when the moveable link is under a force to allow the wireless communication device to operate at a second operating frequency.

In another embodiment, the wireless communication device is coupled to a fixed conductor that is coupled to a series of conductive elements. The fixed conductor acts as a first antenna regardless of any force applied to the series of conductive elements to allow the wireless communication device to operate at a first operating frequency. The series of conductive elements couple to the fixed conductor to become one conductor acting as a second antenna when the series of conductive elements are under a force to allow the wireless communication device to operate at a second operating frequency.

In another embodiment, the wireless communication device is coupled to a series of conductive elements that includes a locking mechanism. The wireless communication device is capable of using the series of conductive elements as an antenna for wireless communication when the locking mechanism is engaged, locking the series of conductive elements in a conductive connection. The conductive connection remains even if the force is later removed from the series of conductive elements.

The interrogation reader may communicate information received from a wireless communication device using the series of conductive elements as an antenna to a reporting system located in close proximity to the interrogation reader, a remote system, or both.

DETAILED DESCRIPTION OF THE INVENTION

The present invention is directed to an antenna coupled to a wireless communication device. The antenna is comprised of a series of conductive elements that do not form conductive connections with each other to form the antenna unless they are placed under a force, such as tension or compression. When the conductive elements are placed under a force, the conductive elements form conductive connections with each other to form a conductor.

This conductor is coupled to a wireless communication device to provide an antenna so that the wireless communication device is capable of communicating at an operating frequency defined by the length and construction of the conductor. In this manner, the wireless communication device, through its communication using the conductor as an antenna, acts as an indicator of force to an interrogation reader since the wireless communication device is not capable of communicating unless the series of conductive elements are under a force. The wireless communication device can be used in various applications as an indicator of force.

Before discussing the particular aspects of the present invention and the embodiments for providing a series of conductive elements to form a conductor and antenna when placed under a force, a brief discussion of interrogation readers and wireless communication devices follows.

Figure 1:
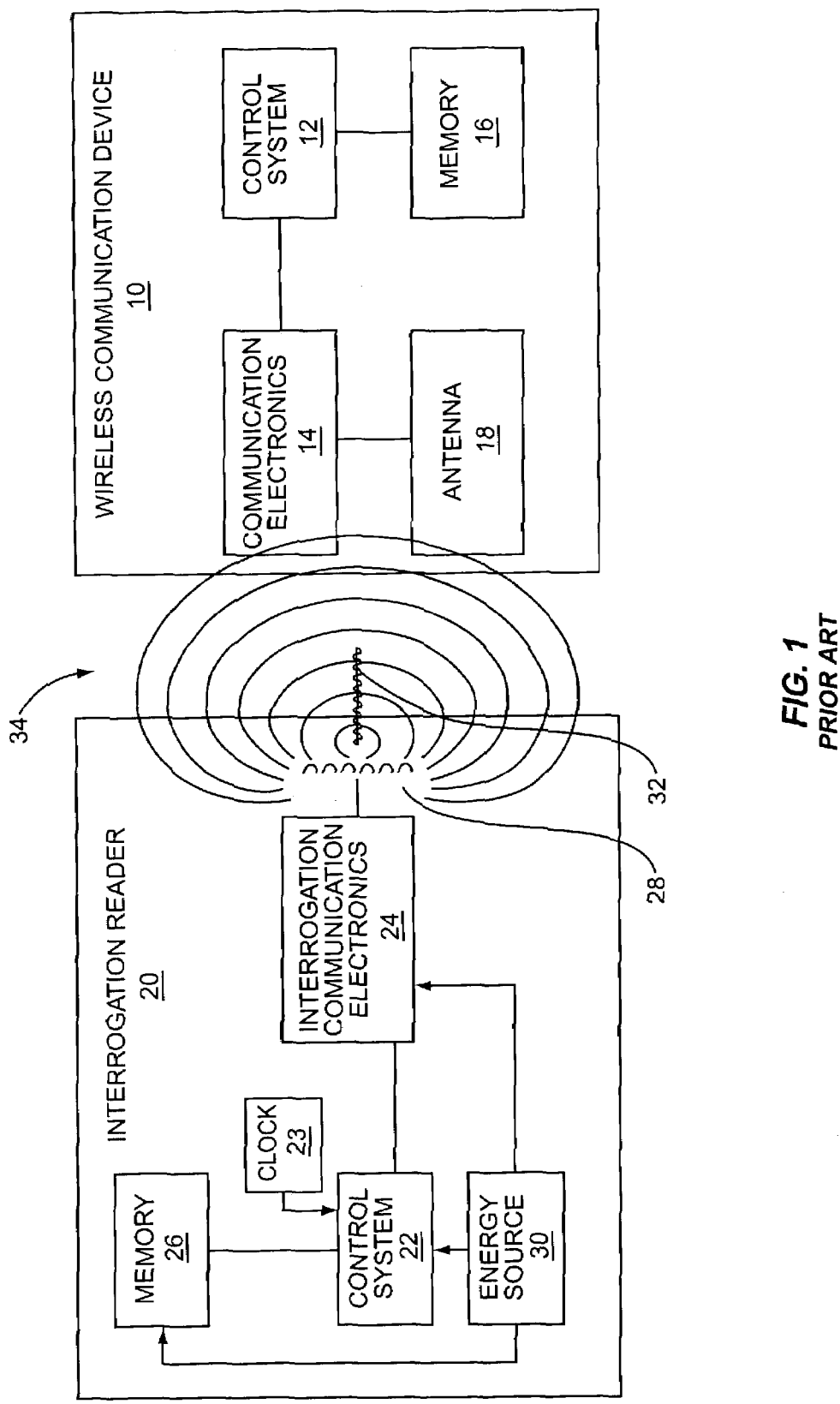
FIG. 1 is a schematic diagram of an interrogation reader and wireless communication device system in the prior art.

FIG. 1 illustrates a typical wireless communication device and communication system in the prior art. The wireless communication device 10 is capable of communicating information wirelessly and may include a control system 12, communication electronics 14, and memory 16. The wireless communication device 10 is also known as a radio-frequency identification device (RFID). The communication electronics 14 is coupled to an antenna 18 for wirelessly communicating information in radio-frequency signals. The communication electronics 14 is capable of receiving modulated radio-frequency signals through the antenna 18 and demodulating these signals into information passed to the control system 12. The antenna 18 may be internal or external to the wireless communication device 10. The antenna 18 may be a pole antenna or a slot antenna.

The control system 12 may be any type of circuitry or processor that receives and processes information received by the communication electronics 14, including a microcontroller or microprocessor. The wireless communication device 10 may also contain a memory 16 for storage of information. Such information may be any type of information about goods or objects associated with the wireless communication device 10, including but not limited to identification, tracking and other pertinent information. The memory 16 may be electronic memory, such as random access memory (RAM), read-only memory (ROM), flash memory, diode, etc., or the memory 16 may be mechanical memory, such as a switch, dip-switch, etc.

Some wireless communication devices 10 are termed "active" devices in that they receive and transmit data using their own energy source coupled to the wireless communication device 10. A wireless communication device 10 may use a battery for power as described in U.S. Pat. No. 6,130,602 entitled "Radio frequency data communications device," or may use other forms of energy, such as a capacitor as described in U.S. Pat. No. 5,833,603, entitled "Implantable biosensing transponder." Both of the preceding patents are incorporated herein by reference in their entirety.

Other wireless communication devices 10 are termed "passive" devices, meaning that they do not actively transmit and therefore may not include their own energy source for power. One type of passive wireless communication device 10 is known as a "transponder." A transponder effectively transmits information by reflecting back a received signal from an external communication device, such as an interrogation reader. An example of a transponder is disclosed in U.S. Pat. No. 5,347,280, entitled "Frequency diversity transponder arrangement," incorporated herein by reference in its entirety. Another example of a transponder is described in co-pending patent application Ser. No. 09/678, 271, entitled "Wireless communication device and method," incorporated herein by reference in its entirety.

It is readily understood to one of ordinary skill in the art that there are many other types of wireless communication devices and communication techniques than those described herein, and the present invention is not limited to a particular type of wireless communication device, technique or method.

FIG. 1 also depicts communication between a wireless communication device 10 and an interrogation reader 20. The interrogation reader 20 may include a control system 22, an interrogation communication electronics 24, memory 26, and an interrogation antenna 28. The interrogation antenna 28 may be a pole antenna or a slot antenna. The interrogation reader 20 may also contain its own internal energy source 30, or the interrogation reader 20 may be powered through an external power source (not shown). The energy source 30 may include a battery, a capacitor, solar cell or other medium that contains energy. The energy source 30 may also be rechargeable. The interrogation reader 20 may also include a clock 23 that is coupled to and used by the control system 22 for changing clock cycles and timing operations and/or other timing calculations.

The interrogation reader 20 communicates with the wireless communication device 10 by emitting an electronic communication signal 32 modulated by the interrogation communication electronics 24 through the interrogation antenna 28. The interrogation antenna 28 may be any type of antenna that can radiate a communication signal 32 through a field 34 so that a reception device, such as a wireless communication device 10, can receive such communication signal 32 through its own antenna 18. The field 34 may be electromagnetic, magnetic, or electric. The communication signal 32 may be a message containing information and/or a specific request for the wireless communication device 10 to perform a task or communicate back information.

When the antenna 18 is in the presence of the field 34 emitted by the interrogation reader 20, the communication electronics 14 are energized by the energy in the communication signal 32, thereby energizing the wireless communication device 10. The wireless communication device 10 remains energized so long as its antenna 18 is in the field 34 of the interrogation reader 20. The communication electronics 14 demodulates the communication signal 32 and sends the message containing information and/or request to the control system 12 for appropriate actions.

Figure 2A:
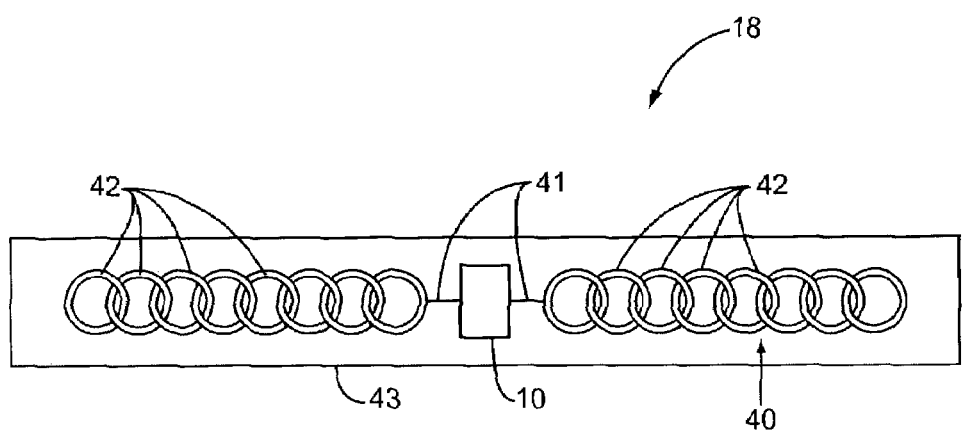
FIG. 2A is a schematic diagram of a chain coupled to a wireless communication device whose links are not under force.

Turning now to aspects of the present invention, FIG. 2A illustrates one embodiment of the antenna 18 for the wireless communication device 10. The antenna 18 is comprised of a series of conductive elements that form a link chain 40. The link chain 40 is coupled to the wireless communication device 10 to act as its antenna 18 when the link chain 40 is under a force, such as tension or compression. In this embodiment, two link chains 40 are coupled to the wireless communication device 10 at coupling points 41 to form a dipole antenna 18.

The link chain 40 is comprised of a plurality of individual links 42 that are circular in shape. The links 42 are constructed out of a conductive material, such as aluminum, cooper, or steel. The wireless communication device 10 and the link chain 40 are attached to a flexible material 43. The flexible material 43 is a resilient material that is capable of flexing, such as stretching or compressing, when a force is placed on the flexible material 43. The flexible material 43, being resilient, returns back to its original shape when a force is not exerted on it. The flexible material 43 may be constructed out of rubber, foam, or any material that is capable of being stretched or compressed and is resilient. Note that the flexible material 43 is optional, and force may be applied directly to the conductive elements to allow the wireless communication device 10 to act as a pressure indicator.

The force exerted on the flexible material 43 may be an external mechanical force, including gravity, or may be caused by the flexible material's 43 response to an environmental condition, such as temperature. The flexible material may be any type of flexible material so long as the material flexes.

The flexible material 43 illustrated in FIG. 2A is not under a force. The links 42 are attached to the flexible material 43 so that the links 42 either (1) do not form a good conductive connection; or (2) any conductive connection whatsoever between each other when the flexible material 43 is not under a force. The wireless communication device 10 is designed to operate at a frequency that uses the link chain 40 as an antenna 18 when the link chain 40 is under a force. So even if there are some links 42 in the link chain 40 that are conductively connected to each other when the flexible material 43 is not under a force, the conductive length of the link chain 40 will be different than is intended for use by the wireless communication device 10 and/or the interrogation reader 20 for their designed operating frequency.

Figure 2B:
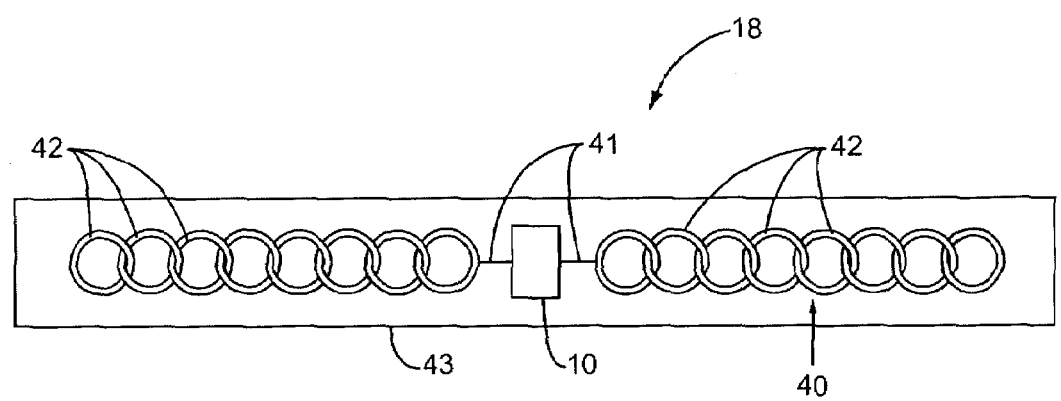
FIG. 2B is a schematic diagram of a chain coupled to a wireless communication device whose links are under force to form a conductor and a dipole antenna.

FIG. 2B illustrates the same wireless communication device 10 and link chain 40 illustrated FIG. 2A, discussed above. However in FIG. 2B, the flexible material 43 is under a force; it is being stretched. This stretching causes the link chain 40 and its links 42 to stretch as well since the links 42 are attached to the flexible material 43. In this manner, the links 42 come into contact with each other to form a conductor that is coupled to the wireless communication device 10, at the couplings 41. When the links 42 form a conductor, the links 42 are continuously coupled to the wireless communication device 10 so that the wireless communication device 10 can use the links 42 as an antenna 18.

The links 42 in the link chain 40 may also be compressed by compressing the flexible material 43 to form a conductor. If the links 42 are compressed so that the links 42 come into conductive contact with each other, the links 42 will form a conductor than can also be used by the wireless communication device 10 as an antenna 18. Compression of the links 42 will create an antenna 18 that is used to communicate at a higher operating frequency than stretching of the links 42, since compression of the links 42 will form a conductor that is shorter in length than a conductor formed by stretching of the links 42.

Whether the flexible material 43 and/or the links 42 are stretched or compressed, the wireless communication device 10 is capable of communicating using the link chain 40 as the antenna 18 at the desired and designed operating frequency if the links 42 form a conductor. When the interrogation reader 20 receives a communication signal 32 from the wireless communication device 10, illustrated in FIG. 2B, the interrogation reader 20 will know that such successful communication is indicative of a threshold force being applied to the flexible material 43 and/or the link chain 40.

Figure 3:
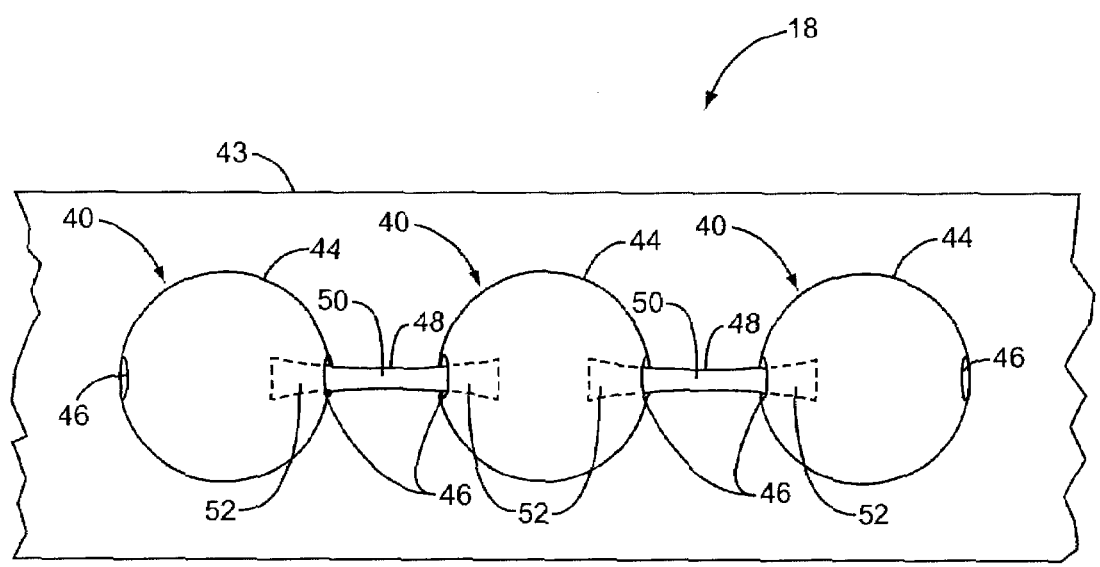
FIG. 3 is a schematic diagram of one embodiment of hollow conductive spheres in a chain that are designed to form a conductor when under force.

FIG. 3 illustrates another embodiment of the present invention wherein the antenna 18 is constructed out of different conductive elements than the links 42 illustrated in FIGS. 2A and 2B. The antenna 18 is comprised of two or more hollow conductive spheres 44 that are attached to the flexible material 43. The hollow conductive spheres 44 may be constructed of aluminum, steel, copper, or any other conductive material. The hollow conductive spheres 44 may be completely hollow or substantially hollow so long as the shaped links 48, discussed below, do not form a substantial conductive connection with the hollow conductive spheres 44 when the hollow conductive spheres 44 are not under a force.

Each hollow conductive sphere 44 contains two orifices 46. The orifices 46 are located on the left-hand side and the right-hand side of each hollow conductive sphere 44. Shaped links 48 are provided between each hollow conductive sphere 44 to connect the hollow conductive spheres 44 together to form a conductor when the hollow conductive spheres 44 are stretched. The shaped links 48 are constructed so that they have a narrow portion 50 in the central region of the shaped link 48 and wider portions 52 on each end of the shaped links 48. The wider portions 52 have a larger diameter than the diameter of the orifices 46. In this manner, the hollow conductive spheres 44 are free to move back-and-forth along the path of the shaped link 48 as force is exerted on the hollow conductive spheres 44. However, the hollow conductive spheres 44 cannot move farther apart than the length of the shaped link 48 since the wider portions 52 of the shaped links 48 are larger in diameter than the orifices 46.

When the flexible material 43 and/or the hollow conductive spheres 44 are under tension, the hollow conductive spheres 44 move apart from each other horizontally along the path of the shaped link 48 until the shape length 48 reaches the point where the diameter of its wider portions 52 reach the diameter size of the orifices 46. In this manner, a conductive connection is made between adjacent hollow conductive spheres 44 through the connectivity of the shaped links 48 to the adjacent hollow conductive spheres 44 through contact with the orifices 46.

The hollow conductive spheres 44 can also come into conductive contact with each other when the flexible material 43 and/or the hollow conductive spheres 44 are compressed together. In this manner, the hollow conductive spheres 44 move closer to each other in a horizontal direction along the path of the shaped link 48. Eventually, the shaped link 48 between adjacent hollow conductive spheres 44 will be totally inside the hollow conductive spheres 44, and the outside of adjacent hollow conductive spheres 44 will come into contact with each other to form a conductor.

Whether the flexible material 43 and/or the hollow conductive spheres 44 are stretched or compressed, the hollow conductive spheres 44 will create a conductor to form an antenna 18 when the stretching or compressing causes the hollow conductive spheres 44 to conductively contact each other to form a conductor. When the interrogation reader 20 receives a communication signal from the wireless communication device 10 using the antenna 18 formed by the hollow conductive spheres 44 forming a conductor, the interrogation reader 20 will know that such successful communication is indicative of a defined force being applied to the flexible material 43.

Figure 4:
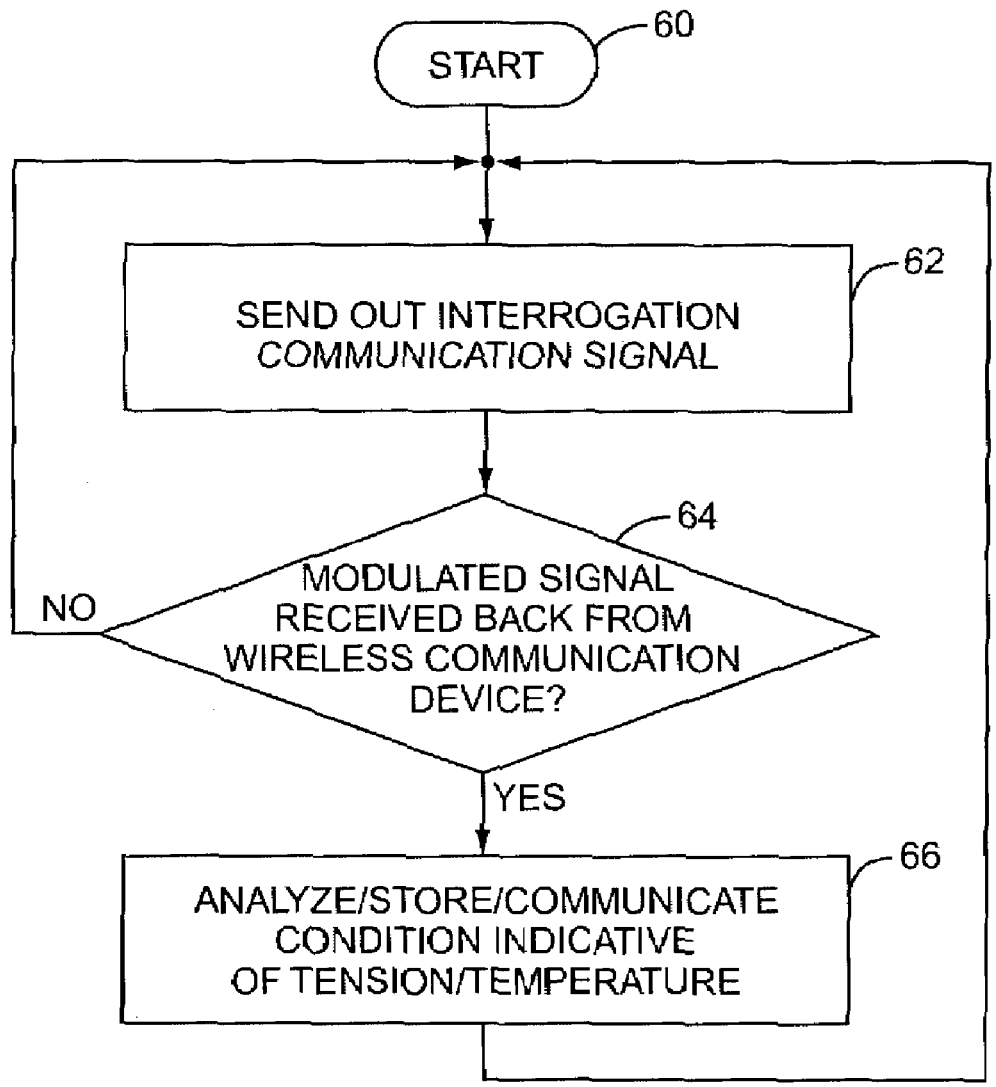
FIG. 4 is a flowchart diagram of an interrogation reader determining that a certain force or temperature threshold condition has been met at the wireless communication device when the interrogation reader receives successful communication from the wireless communication device.

FIG. 4 illustrates a flowchart diagram of the process executed by the interrogation reader 20 to determine if a wireless communication device 10 in the range of its field 34 is under a force. The wireless communication device 10 may use any antenna 18 that is a series of conductive elements that form a conductor when the elements are under a force, such as tension or compression. The wireless communication device 10 may use an antenna 18, such as a link chain 40 or hollow conductive spheres 44, as illustrated in FIGS. 2 and 3 and discussed above.

The process starts (block 60), and the interrogation reader 20 sends out a communication signal 32 through the field 34 to establish communications with any wireless communication device 10 in the range of the field 34 (block 62). If the interrogation reader 20 does not receive a modulated signal response back from any wireless communication device 10 (decision 64), this is indicative of one of two conditions; (1) there is no wireless communication device 10 present in the range of the field 34; or (2) a wireless communication device 10 in the range of the field 34 is not under a force such that the conductive element coupled to the wireless communication device 10 forms a conductor to form an antenna 18. In either condition, the interrogation reader 20 repeats by again sending out a communication signal 32 (block 62) in a looping manner until a modulated communication signal 32 response is received back from a wireless communication device 10.

If the interrogation reader 20 receives a response signal back from a wireless communication device 10 (decision 64), this is indicative that the wireless communication device 10 is under a force since the wireless communication device 10 is configured with an antenna 18 that does not form a conductor unless the antenna 18 is under a force. The interrogation reader 20 receives the communication from the wireless communication device 10 and takes any action necessary and/or designed to be carried out (block 66). The interrogation reader 20 repeats the process by sending out a communication signal 32 to determine if either the same wireless communication device 10 as was previously interrogated is still under a force and/or if another wireless communication device 10 is under a force (block 62).

As an example, the communication signal 32 received by the interrogation reader may include the identification of the wireless communication device 10. This identification may uniquely identify a good or article of manufacture that contains the wireless communication device 10. In this manner, the interrogation reader is capable of determining and/or reporting that the good is under a force. The interrogation reader 20 must be designed to operate at an operating frequency that is the same as the operating frequency of the wireless communication device 10 using the antenna 18 as it is under force. Various examples of applications that may use the present invention are discussed below and illustrated in FIGS. 5–12.

Figure 5:
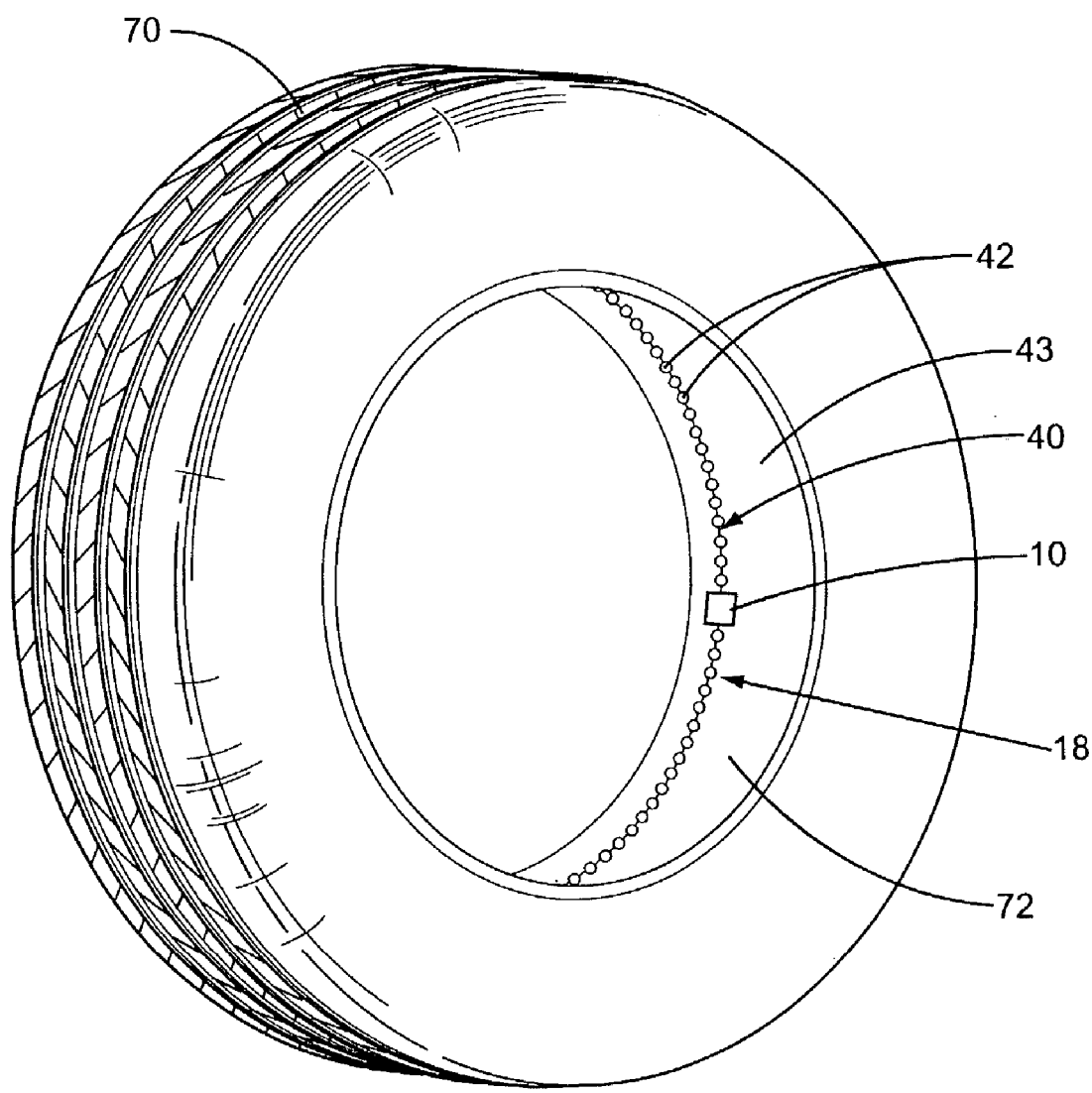
FIG. 5 is a schematic diagram of a chain coupled to a wireless communication device in a tire that forms an antenna when the tire is inflated to a certain pressure level.

FIG. 5 illustrates one application for use of the wireless communication device 10 and antenna 18 to indicate the pressure of a tire 70. The wireless communication device 10 is coupled to a link chain 40, and both are placed in the inside 72 of the tire 70. The inside 72 of the tire 70 is comprised of a flexible material 43, namely rubber, that stretches and expands when put under pressure. As the tire 70 is inflated under pressure, the antenna 18 components stretch or expand. If the tire 70 is inflated to a threshold pressure, the links 42 form a conductor to provide an antenna 18 to the wireless communication device 10. At this threshold pressure, the wireless communication device 10 will be able to respond to an interrogation reader 20 communication signal 32 using the link chain 40 as an antenna 18.

The interrogation reader 20 is designed such that its receipt of communication by a wireless communication device 10 indicates that the tire 70 has been inflated to a certain pressure. Note that other conductive elements, such as hollow conductive spheres 44, may also be used with this embodiment to form the conductor and antenna 18.

Figure 6:
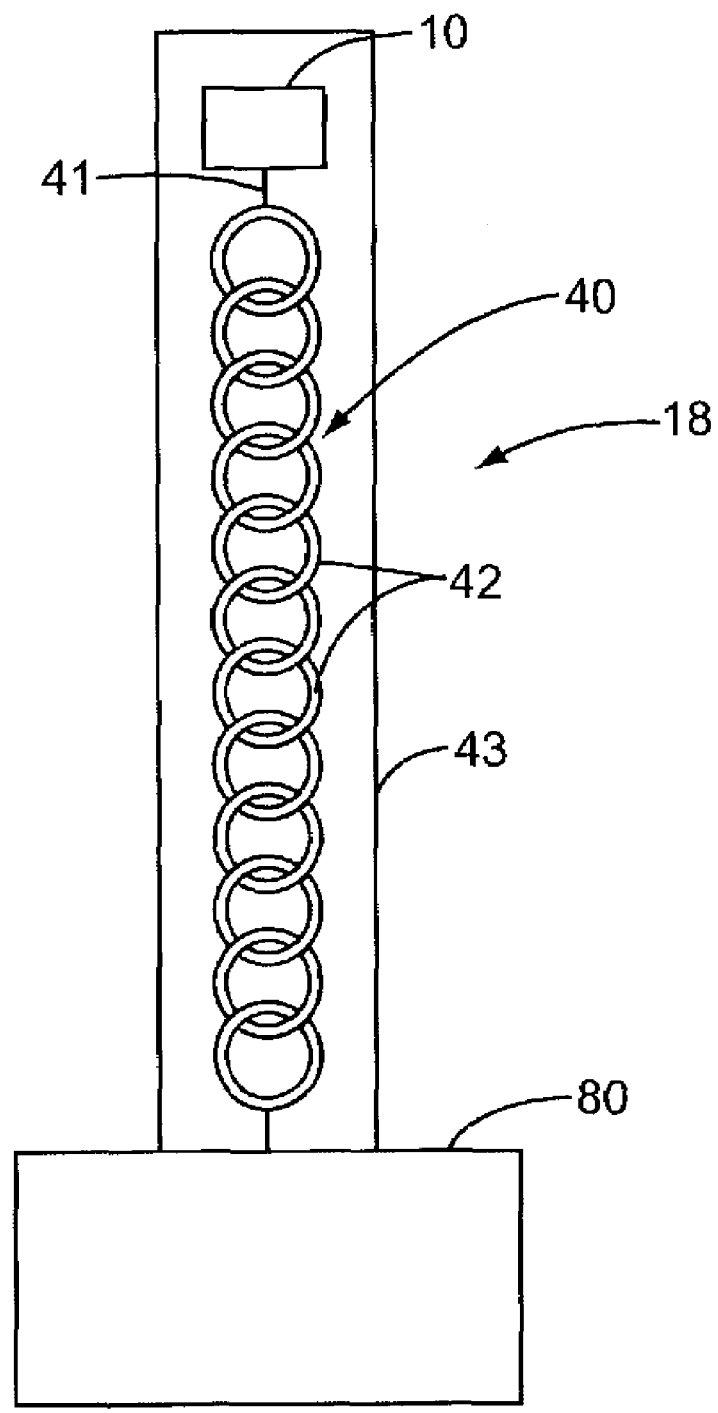
FIG. 6 is a schematic diagram of a chain coupled to a load and to a wireless communication device such that the chain forms an antenna when the load is above a certain weight.

FIG. 6 illustrates another application of the present invention wherein the wireless communication device 10 is designed to communicate with an interrogation reader 20 when an object or load 80 is above a certain threshold weight. The wireless communication device 10 is attached to a flexible material 43. The wireless communication device 10 is also coupled to a link chain 40 that is attached to the flexible material 43, like that illustrated in FIG. 2, to provide an antenna 18. However in this embodiment, the link chain 40 is aligned in a vertical direction so that gravity is the force applied on the flexible material 43.

If the weight of the load 80 is sufficient to pull down on and stretch the flexible material 43 such that the links 42 form conductive connections with each other to form a conductor, the wireless communication device 10 will be capable of responding to an interrogation reader 20 communication signal 32 using the link chain 40 as an antenna 18. In this manner, the wireless communication device 10 and link chain 40 attached to the flexible material 43 form a weight indicator so that an interrogation reader 20 is capable of determining if the load 80 is above a certain threshold weight. Again, note that other conductive elements, such as hollow conductive spheres 44, may also be used with this embodiment to form the conductor.

Figure 7:
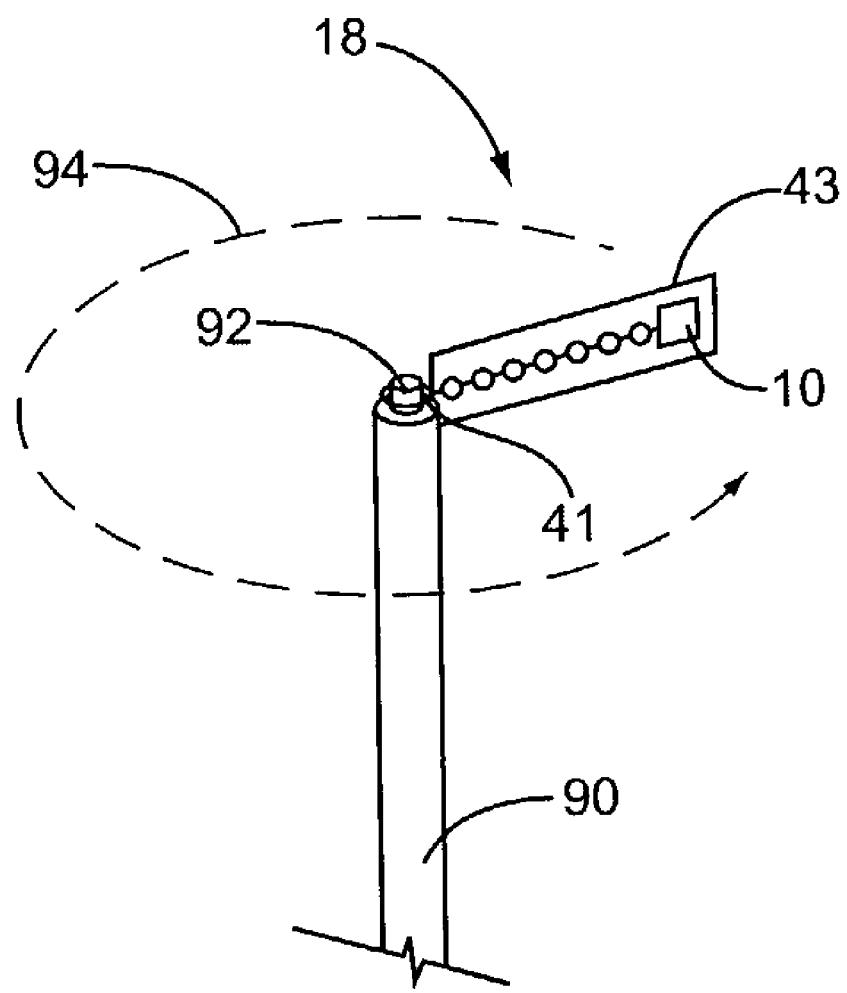
FIG. 7 is a schematic diagram of a chain coupled to an axle and to a wireless communication device such that the chain forms an antenna when the axle rotates above a certain speed.

FIG. 7 illustrates another application of the present invention wherein the wireless communication device 10 is capable of communicating to an interrogation reader 20 if an axle 90 rotates above a certain speed. The wireless communication device 10 is coupled to a series of hollow conductive spheres 44 to form an antenna 18 when the hollow conductive spheres 44 form a conductor, as illustrated in FIG. 3. The wireless communication device 10 and series of hollow conductive spheres 44 are attached to a flexible material 43. The axle 90 rotates in either a clockwise or counterclockwise direction. The series of hollow conductive spheres 18 is connected to the axle 90 at an attachment point 92.

As the axle 90 rotates, the centrifugal force of the rotation causes the hollow conductive spheres 44 to move outward from the axle 90 in the rotation path 94. Centrifugal force is speed divided by the radius of the rotating object squared. If the speed of rotation and therefore the centrifugal force goes above a certain threshold of speed, the hollow conductive spheres 44 will move apart along the shaped link 48 to form conductive connections with each other to form a conductor. In this manner, the wireless communication device 10 and the hollow conductive spheres 44 attached to the flexible material 43 form a speed indicator so that an interrogation reader 20 is capable of determining if the axle 90 is rotating above a certain threshold speed. Again, note that other conductive elements, such as links 42, may also be used with this embodiment to form the conductor.

In another embodiment, the series of conductive elements, such as a link chain 40 or series of hollow conductive spheres 44, may be used to indicate if a sufficient amount of pressure has been applied to a security strap. For example, the link chain 40 coupled to a wireless communication device 10 may be used as a securing strap for air-cargo pallets. The wireless communication device 10 cannot use the strap as an antenna 18 unless the strap has been secured with the correct amount of pressure. An example of straps that are attached to pallets to secure cargo is disclosed in co-pending patent application Ser. No. 09/712,645 entitled "Wireless transport communication device and method," filed on Nov. 14, 2000, and incorporated herein by reference in its entirety.

Figure 8:
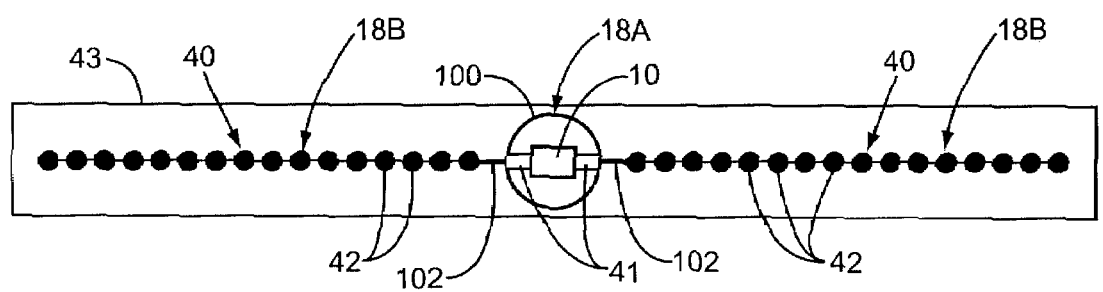
FIG. 8 is a schematic diagram of a chain and a tuning ring coupled to a wireless communication device such that the wireless communication device can operate at a first operating frequency using the tuning ring as a first antenna and can operate at a second operating frequency using the chain as a second antenna.

FIG. 8 illustrates another embodiment of the antenna 18 wherein a tuning ring 100 is coupled to the wireless communication device 10 through the couplings 41. A link chain 40 is attached on each side of the tuning ring 100 at connection points 102. In this embodiment, two link chains 40 are coupled to the tuning ring 100 to form a dipole antenna 18 when the link chains 40 are under a force to form conductors.

The tuning ring 100 is used to improve the connection strains between the wireless communication device 10 and the link chain 40 so that a force applied to the link chain 40 exerts force on the tuning ring 100 rather than the wireless communication device 10. In addition, the tuning ring 100 allows the wireless communication device to communicate at two different operating frequencies. The tuning ring 100 always forms a conductive connection with the wireless communication device 10 to form a first antenna 18A regardless of the force, lack thereof, applied to the flexible material 43, the link chain 40, and/or the tuning ring 100. The tuning ring 100 provides the first antenna 18A so that the wireless communication device 10 is capable of operating at a first operating frequency. In one embodiment, the turning ring 100 is constructed to resonate at around about 2.45 GHz.

If a sufficient force is exerted on the link chain 40, the individual links 42 form conductive connections with each other to form a second, dipole antenna 18B. The link chain 40 forms an antenna 18B that is designed to operate at a different, second operating frequency than designed for the tuning ring 100. In this manner, the wireless communication device 10 is capable of communicating a second operating frequency when a force is exerted on the flexible material 43 and/or the link chain 40. In one embodiment, the link chain 40 is constructed to resonate at around about 915 MHz. Again, note that other conductive elements, such as hollow conductive spheres 44, may also be used with this embodiment to form the conductor.

Figure 9:
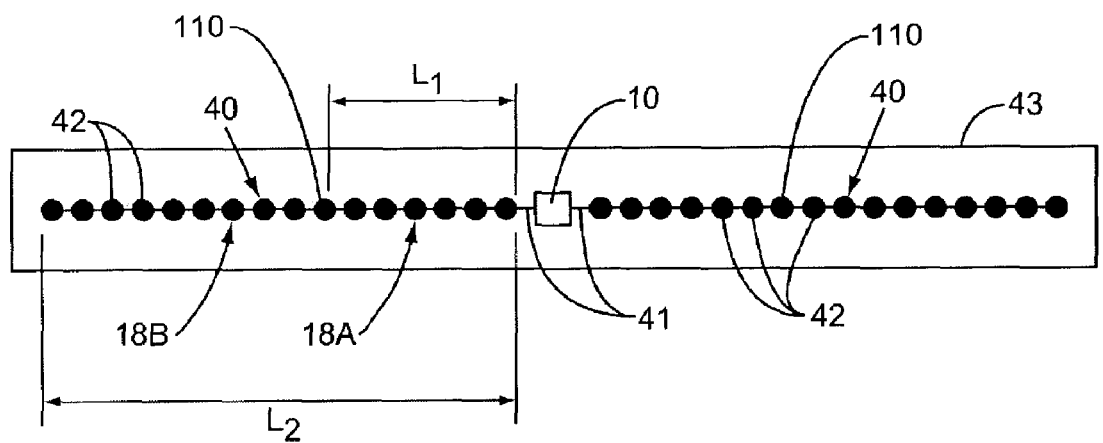
FIG. 9 is a schematic diagram of a chain that has one moveable link coupled to a wireless communication device so that the wireless communication device can communicate at a first operating frequency when the chain forms a first antenna and can communicate at a second operating frequency when a force is placed on the moveable link to form a second antenna.

FIG. 9 illustrates another embodiment of the present invention that is similar to the embodiment illustrated in FIG. 8. The wireless communication device 10 is capable of communicating at two different operating frequencies. However, this embodiment does not contain the tuning ring 100. A link chain 40 is coupled to the wireless communication device 10 that contains a moveable link 110 that is free to move about. This moveable link 110 will form a conductive connection with adjacent links 42 in the link chain 40 if a certain threshold force is applied to the link chain 40. The other links 42 in the link chain 40 are conductively coupled to each other regardless of the force applied to the link chain 40, or lack thereof.

The wireless communication device 10 is coupled to the link chain 40 to form a first antenna 18A of length $L_1$ when the moveable link 110 does not form a conductive connection with adjacent links 42. In this manner, the wireless communication device 10 is capable of operating at a first operating frequency as defined by the length $L_1$ and the construction of the first antenna 18A. In one embodiment, the length $L_1$ is approximately 30.6 millimeters so that the link chain 40 of length $L_1$ resonates at around about 2.45 GHz.

When a force is applied to the link chain 40 such that the moveable link 110 forms a conductive connection with adjacent links 42 in the link chain 40, a second antenna 18B of length $L_2$ is coupled to the wireless communication device 10. In this manner, the wireless communication device 10 is capable of operating at a second operating frequency as defined by the length and construction of the second antenna 18B when the flexible material 43 and/or the link chain 40 are subject to a certain threshold force. In one embodiment, the length $L_2$ is approximately 51.4 millimeters so that the link chain 40 of length $L_2$ resonates at around about 915 MHz. Again, note that other conductive elements, such as consecutive hollow conductive spheres 44, may also be used with this embodiment to form the conductor.

Also note that more than one moveable link 110 may be placed in the link chain 40 so that the link chain 40 has an upper and lower frequency range. For example, one moveable link 110 may be placed in the link chain 40 at a distance of 30 millimeters from the end of the link chain 40 so that the link chain 40 resonates at around about 2.5 GHz when a force is placed on the first moveable link 110. A second moveable link 110 may be placed in the link chain 40 at a distance of 31 millimeters from the end of the link chain 40 so that the link chain 40 resonates at around about 2.4193 GHz when a force is placed on the second moveable link 110. In this manner, the antenna 18 formed by the link chain 40 tunes itself with force.

Figure 10:
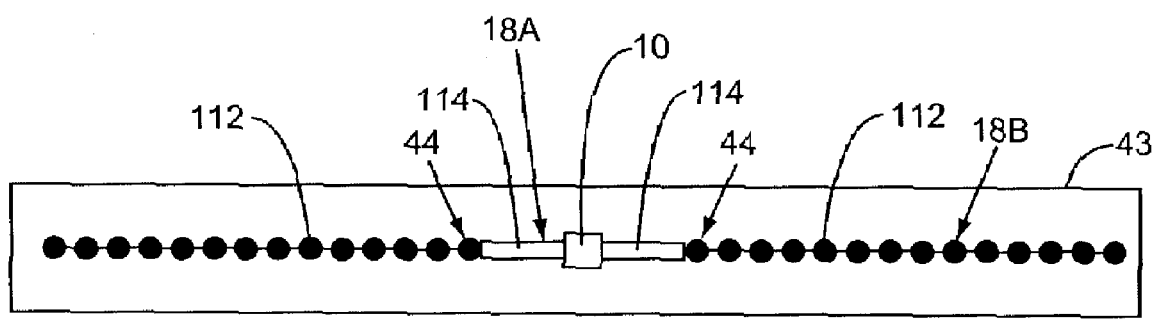
FIG. 10 is a schematic diagram of a wireless communication device coupled to a fixed conductor to act as a first antenna to communicate at a first operating frequency and coupled to a chain to act as a second antenna to communicate at a second operating frequency when a force is placed on the chain.

FIG. 10 illustrates another embodiment of the present invention wherein a wireless communication device 10 is capable of operating at two different frequencies using two different antenna 18 lengths. A fixed conductor 14 is coupled to the wireless communication device 10 to form a first antenna 18A. The fixed conductor 114 has a fixed length that does not change as force is applied. In this embodiment, two fixed conductors are attached to the wireless communication device 10 to form a dipole antenna 18A.

A series of metal spheres 112 are coupled to the fixed conductors 114. The metal spheres 112 are conductively coupled to each other regardless of force applied, or lack thereof. Hollow conductive spheres 44, illustrated in FIG. 3, are connected on the ends of the metal spheres 112 such that the metal spheres 112 are connected in between the hollow conductive spheres 44 and the fixed conductor 114. The metal spheres 112 are coupled to each other regardless of force. The hollow conductive spheres 44 form a conductive connection with the metal spheres 112 to form a conductor if a certain threshold force is applied to the metal spheres 112. In this manner, the wireless communication device 10 is capable of communicating at a first operating frequency using the first antenna 18A if a certain threshold force is not applied to the metal spheres 112, since only the fixed conductor 114 will be coupled to the wireless communication device 10.

The wireless communication device 10 will communicate at a second operating frequency formed by the hollow conductive spheres 44 conductively coupled to the fixed conductor 114, through the metal spheres 112, to form a second, longer antenna 18B if a certain threshold force is applied to the metal spheres 112. Again, note that other conductive elements, such as links 42, may also be used with this embodiment to form the conductor.

Figure 11A:
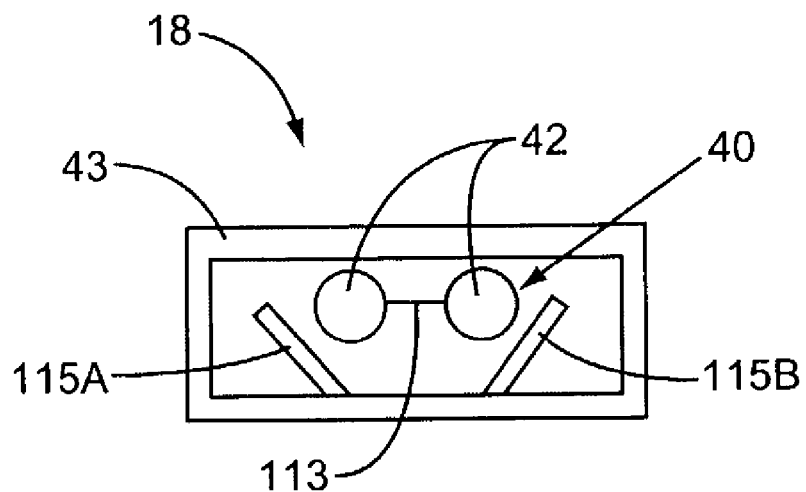
FIG. 11A is a schematic diagram of conductive elements in a locking mechanism that is in an unlocked position.
Figure 11B:
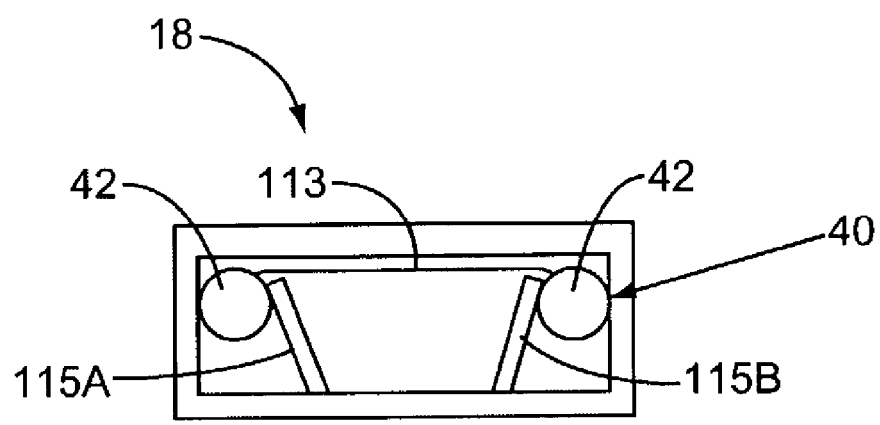
FIG. 11B is a schematic diagram of conductive elements in a locking mechanism in a locked position wherein the conductive elements and locking mechanism form a conductor to be used by a wireless communication device as an antenna.

FIGS. 11A and 11B illustrate another embodiment of the present invention wherein an interrogation reader 20 is capable of ascertaining if a wireless communication device 10 has been subjected to a certain threshold force. A series of links 42 are coupled to the wireless communication device 10, as illustrated in FIG. 3, to form the antenna 18. FIG. 11A illustrates two locking mechanisms 115A, 115B in an unlocked position that are provided inline in the series of links 42 attached by a linking device 113. The locking mechanisms 115A, 115B are placed on the outside of two adjacent links 42. The locking mechanisms 115A, 115B are slanted outward and are designed only to move outward and return to their original position, but the locking mechanisms 115A, 115B will not move further inward than their resting position, as illustrated in FIG. 11A.

As the links 42 are pulled outward on each side, the locking mechanisms 115A, 115B move outward, and the height of the locking mechanisms 115A, 115B lower. If a sufficient tension is exerted on the links 42, the links 42 will exert pressure on the locking mechanisms 115A, 115B thereby moving the locking mechanisms 115A, 115B outward. Eventually, the locking mechanisms 115A, 115B will move outward such that the links 42 will clear the locking mechanisms 115A, 115B and move to their outside, as illustrated in FIG. 11B.

The locking mechanisms 115A, 115B are constructed out of a conductive material so that the locking mechanisms 115A, 115B form part of the conductor used by the wireless communication device 10 as an antenna 18 when in a locked position. When the locking mechanisms 115A, 115B are in a locked position, the links 42, by the force of the linking device 113 causing the links 42 to have force placed on them inwardly, are in conductive contact with the locking mechanisms 115A, 115B, thereby forming a conductor to be used by the wireless communication device 10 as an antenna 18 for communications to an interrogation reader 20.

Since the locking mechanisms 115A, 115B only become locked when a certain threshold force is applied to the links 42, the conductor is only formed when a certain threshold force has been applied to the links 42 at least once. Once this threshold force has been applied, the conductor stays formed even if the force is released due to the locking mechanism 115A, 115B keeping the links 42 from releasing, thereby breaking the conductivity in the conductor.

The interrogation reader 20, by receipt of communication from the wireless communication device 10 that includes the locking mechanisms 115A, 115B has knowledge that a certain threshold force has been applied to the links 42. If the wireless communication device 10 was not in range of the field 34 of the interrogation reader 20 at the time the threshold force was applied to the links 42, the interrogation reader 20 could still determine that the threshold force was applied to the wireless communication device 10 at some time in its past since the locking mechanisms 115A, 115B stay locked, keeping the conductor formed. Again, note that other conductive elements, such as hollow conductive spheres 44, may also be used with this embodiment to form the conductor.

Figure 12:
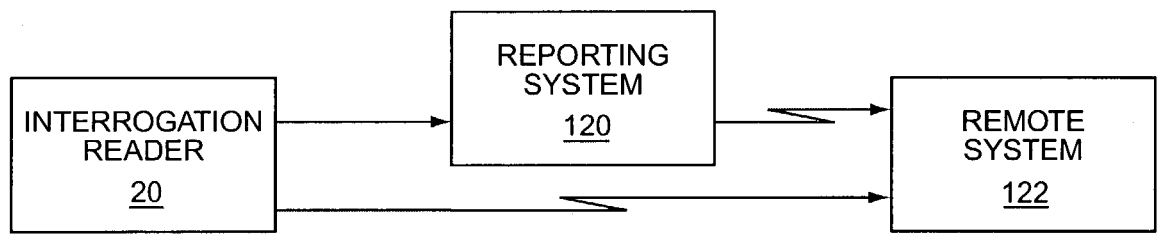
FIG. 12 is a schematic diagram of a reporting system.

FIG. 12 illustrates a block diagram of an information reporting configuration for the present invention whereby information received by the interrogation reader 20 from wireless communication devices 10 is communicated to other systems. The interrogation reader 20 may be coupled to a reporting system 120. This reporting system 120 may be located in close proximity to the interrogation reader 20, and may be coupled to the interrogation reader 20 by either a wired or wireless connection. The reporting system 120 may be a user interface or other computer system that is capable of receiving information about objects that contain wireless communication devices 10. The information may be used to track the objects or to store information concerning the objects in memory (not shown).

The reporting system 120 may also further communicate information from the wireless communication devices 10 to a remote system 122 located remotely from the reporting system 120 and/or the interrogation reader 20. The communication between the reporting system 120 and the remote system 122 may be through wired communication, modem communication or other networking communication, such as the Internet. Alternatively, the interrogation reader 20 may communicate information about the wireless communication devices 10 directly to the remote system 122 rather than first reporting the information through the reporting system 120.

Certain modifications and improvements will occur to those skilled in the art upon a reading of the foregoing description. It should be understood that the present invention is not limited to any particular type of component, including but not limited to the wireless communication device 10 and its components, the interrogation reader 20 and its components, the link chain 40, the links 42, the flexible material 43, the hollow conductive sphere 44, the shaped link 48, the tire 70, the load, 80, the axle 90, the tuning ring 100, the moveable link 110, the metal spheres 112, the locking mechanisms 115A, 115B, the linking device 113, the fixed conductor 114, the reporting system 120, and the remote system 122. For the purposes of this application, couple, coupled, or coupling is defined as either a direct connection or a reactive coupling. Reactive coupling is defined as either capacitive or inductive coupling.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A device capable of wirelessly communicating information, comprising:
   a wireless communication component; and
   a series of conductive elements that couple together in a manner to form a conductor when said series of conductive elements is under a force,
   wherein said series of conductive elements does not form a conductor unless said series of conductive elements is under said force, and
   wherein at least one conductive element in said series of conductive elements is coupled to said wireless communication component to form an antenna for said component to wirelessly communicate information when said series of conductive elements forms said conductor under said force.

2. The device of claim 1, wherein said series of conductive elements is comprised of two different series of conductive elements coupled to said wireless communication component to form a dipole antenna.

3. The device of claim 1, wherein said series of conductive elements is flexible.

4. The device of claim 1, wherein said force is comprised from the group consisting of a stretching force, a compression force, a rotation force, and an expansion force.

5. The device of claim 1, wherein said series of conductive elements is a link chain.

6. The device of claim 1, wherein said series of conductive elements is comprised of a plurality of hollow conductive spheres each having two orifices and a shaped link confining the distance between each of said plurality of hollow conductive spheres, wherein said shaped link has a narrow center and wider outer edges, wherein said wider outer edges are inside said orifices and are larger in diameter than said orifices so that said shaped link creates a conductive connection between said hollow conductive spheres when said plurality of hollow conductive spheres is stretched, and wherein said shaped link does not create said conductive connection between said hollow conductive spheres unless said plurality of hollow conductive spheres is stretched.

7. The device of claim 6, wherein said plurality of hollow conductive spheres is placed inside a tire and said plurality of hollow conductive spheres forms a conductor when the pressure of said tire reaches a threshold pressure level, and wherein said plurality of conductive hollow conductive spheres does not form said conductor unless the pressure of said tire reaches said threshold pressure level.

8. The device of claim 6, wherein said plurality of hollow conductive spheres is attached to an object that stretches said plurality of hollow conductive spheres to form a conductor when said object is above a threshold weight level, and wherein said plurality of hollow conductive spheres does not form said conductor unless said object is above said threshold weight level.

9. The device of claim 8, wherein said plurality of hollow conductive spheres is attached to an air cargo pallet.

10. The device of claim 6, wherein said plurality of hollow conductive spheres are attached to an axle that stretches said plurality of hollow conductive spheres to form a conductor when said axle rotates above a threshold speed, and wherein said plurality of hollow conductive spheres does not form said conductor unless said axle rotates above said threshold speed.

11. The device of claim 10, wherein said axle is on a vehicle.

12. The device of claim 1, wherein said series of conductive elements is placed inside a tire and said series of conductive elements forms a conductor when the pressure of said tire reaches a threshold pressure level, and wherein said series of conductive elements does not form said conductor unless the pressure of said tire reaches said threshold pressure level.

13. The device of claim 1, wherein said series of conductive elements are attached to an object that stretches said series of conductive elements to form a conductor when said object is above a threshold weight level, and wherein said series of conductive elements does not form said conductor unless said object is above said threshold weight level.

14. The device of claim 13, wherein said series of conductive elements are attached to an air cargo pallet.

15. The device of claim 1, wherein said series of conductive elements are attached to an axle that stretches said series of conductive elements to form a conductor when said axle rotates above a threshold speed, and wherein said series of conductive elements does not form said conductor unless said axle rotates above said threshold speed.

16. The device of claim 15, wherein said axle is on a vehicle.

17. The device of claim 1, further comprising a tuning ring coupled to said series of conductive elements and coupled to said wireless communication component to reduce the strain on said wireless communication component caused by said series of conductive elements being placed under said force.

18. The device of claim 17, wherein said tuning ring acts as an antenna apart from said series of conductive elements so that said wireless communication component is capable of operating at more than one frequency.

19. The device of claim 18, wherein said tuning ring resonates at an operating frequency of around about 2.45 GHz, and said series of conductive elements resonates at an operating frequency of around about 915 MHz when under said force.

20. The device of claim 1, wherein said series of conductive elements contains one moveable link and forms a first conductor with a first operating frequency when said moveable link is not under said force, wherein said series of conductive elements forms a second conductor that is longer than said first conductor with a second operating frequency when said force is placed on said moveable link, and wherein said series of conductive elements does not form said second conductor unless said force is placed on said moveable link.

21. The device of claim 20, wherein the length of said first conductor is around about 30.6 millimeters and the length of said second conductor is around about 51.4 millimeters.

22. The device of claim 21, wherein said first conductor has an operating frequency of around about 2.45 GHz and the second conductor has an operating frequency of around about 915 MHz.

23. The device of claim 20, wherein said first conductor has an operating frequency of around about 2.45 GHz and the second conductor has an operating frequency of around about 915 MHz.

24. The device of claim 1, wherein said series of conductive elements contains two moveable links and forms a first conductor when a first force is applied to the first of said moveable links and a second conductor of a length greater than said first conductor when a second force is applied to the second of said moveable links so that said series of conductive elements has a frequency operating range between the operating frequency of said first conductor and said second conductor.

25. The device of claim 24, wherein the length of said first conductor is around about 30 millimeters and the length of said second conductor is around about 31 millimeters.

26. The device of claim 25, wherein said first conductor has an operating frequency of around about 2.4193 GHz and said second conductor has an operating frequency of around about 2.5 GHz.

27. The device of claim 24, wherein said first conductor has an operating frequency of around about 2.4193 GHz and said second conductor has an operating frequency of around about 2.5 GHz.

28. The device of claim 1, further comprising a locking mechanism adjacent to at least one conductive element in said series of conductive elements that locks said series of conductive elements to form a conductor when a threshold force is placed on said series of conductive elements, and wherein said locking mechanism does not lock said series of conductive elements to form said conductor unless said threshold force is placed on said series of conductive elements.

29. The device of claim 28, wherein said series of conductive elements is a link chain.

30. The device of claim 28, further comprising a conductor that is coupled in between said wireless communication component and said series of conductive elements to form an antenna having a first fixed length to operate at a first operating frequency when said series of conductive elements are unlocked and wherein said series of conductive elements form an antenna having a second length to operate at a second operating frequency when said series of conductive elements are locked.

31. The device of claim 30, wherein said first operating frequency is around about 2.45 GHz and said second operating frequency is around about 915 MHz.

32. The device of claim 1, wherein said series of conductive elements are comprised of a material that expands in relation to temperature.

33. The device of claim 1, wherein said series of conductive elements are coupled to a temperature sensitive material that expands in relation to temperature thereby causing said series of conductive elements to stretch in relation to temperature.

34. The device of claim 1, wherein said series of conductive elements contains two expansion points, wherein said series of conductive elements forms a first conductor with a first operating frequency at a first temperature and forms a second conductor that is longer in length than said first conductor with a second operating frequency at a second temperature.

35. The device of claim 34, wherein the length of said first conductor is around about 30.6 millimeters and the length of said second conductor is around about 51.4 millimeters.

36. The device of claim 35, wherein said first conductor has an operating frequency of around about 2.45 GHz and the second conductor has an operating frequency of around about 915 MHz.

37. The device of claim 34, wherein said first conductor has an operating frequency of around about 2.45 GHz and the second conductor has an operating frequency of around about 915 MHz.

38. A wireless communication system for wirelessly communicating force information, comprising:
   an interrogation reader that generates a radiating field to communicate the force information;
   a wireless communication device; and
   a series of conductive elements that couple together in a manner to form a conductor when said series of conductive elements is under a force, wherein said series of conductive elements does not form said conductor unless said series of conductive elements is under said force;
   wherein at least one of said series of conductive elements is coupled to said wireless communication device to form an antenna for communicating with said interrogation reader when said series of conductive elements forms said conductor and when said series of conductive elements is in the range of said field.

39. The system of claim 38, wherein said force is comprised from the group consisting of a stretching force, a compression force, a rotation force, and an expansion force.

40. The system of claim 38, wherein said series of conductive elements are coupled to a temperature sensitive material that expands in relation to temperature thereby causing said series of conductive elements to stretch in relation to temperature.

41. The system of claim 38, further comprising a reporting system that receives the force information from said interrogation reader after the force information is received by said interrogation reader from said wireless communication device.

42. The system of claim 38, further comprising a remote system that receives the force information from said reporting system after the force information is received by said interrogation reader.

43. The system of claim 38, further comprising a remote system that receives the force information from said interrogation reader after the force information is received by said interrogation reader from said wireless communication device.

44. A method of wirelessly communicating information, comprising the steps of:
  placing a series of conductive elements that couple together under a force to form a conductor and does not form said conductor unless under said force; and
  communicating information using said series of conductive elements as an antenna when said series of conductive elements is placed under said force to form said conductor.

45. The method of claim 44, wherein said placing comprises placing said series of conductive elements that couple together under said force individually in a manner to form two conductors that form a dipole antenna.

46. The method of claim 44, wherein said placing comprises stretching said series of conductive elements that couple together in a manner to form a conductor.

47. The method of claim 44, wherein said placing comprises compressing said series of conductive elements that couple together in a manner to form a conductor.

48. The method of claim 44, wherein said placing comprises rotating said series of conductive elements that couple together in a manner to form a conductor.

49. The method of claim 44, further comprising placing said force on a tuning ring coupled to said series of conductive elements and to a wireless communication device to reduce the strain on said wireless communication device caused by said series of conductive elements being placed under said force.

50. The method of claim 49, further comprising communicating at a first frequency using said tuning ring as a first antenna and communicating at a second frequency using said conductor formed by said series of conductive elements being coupled together under said force to form a second antenna.

51. The method of claim 44, wherein said placing further comprises placing said series of conductive elements that couple together under a first force to form a first conductor length capable of operating at a first frequency in a first mode of operation, and placing said series of conductive elements that couple together under a second force to form a second conductor length capable of operating at a second frequency in a second mode of operation.

52. The method of claim 51, wherein said placing further comprises placing said first force on a first of said series of conductive elements and placing said second force on a second of said series of conductive elements that is located adjacent to said first of said series of conductive elements.

53. The method of claim 44, wherein said placing further comprises locking said series of conductive elements that couple together when placed under said force.

54. The method of claim 44, wherein said communicating information further comprises communicating at a first frequency using a conductor coupled between said series of conductive elements and a wireless communication device and communicating at a second frequency after locking said series of conductive elements coupled together when placed under said force.

55. The method of claim 44, wherein placing said series of conductive elements that couple together under said force to form said conductor comprises expanding said series of conductive elements coupled together that expand in relation to temperature to form said conductor.

56. The method of claim 55, wherein said expanding further comprises attaching said series of conductive elements to a temperature sensitive material that expands in relation to temperature and thereby causes said series of conductive elements to stretch in relation to temperature.

57. The method of claim 55, wherein said expanding comprises expanding said series of conductive elements coupled together individually in a manner to form two conductors to form a dipole antenna.

58. The method of claim 55, wherein said expanding further comprises expanding said series of conductive elements that couple together under a first force to form a first conductor length capable of operating at a first frequency in a first mode of operation, and expanding said series of conductive elements that couple together under a second force to form a second conductor length capable of operating at a second frequency in a second mode of operation.

59. The method of claim 58, wherein said expanding further comprises expanding a first of said series of conductive elements and expanding a second of said series of conductive elements that is located adjacent to said first of said series of conductive elements.

60. The method of claim 55, wherein said expanding further comprises locking said series of conductive elements coupled together when expanded.

61. The method of claim 55, wherein said communicating information further comprises:
  communicating at a first frequency using a conductor coupled between a wireless communication device and said series of conductive elements, and
  communicating at a second frequency after locking said series of conductive elements that couple together when expanded.

62. The method of claim 44, further comprising reporting the information that is communicated using said series of conductive elements to a reporting system.

63. The system of claim 62, further comprising reporting the force information received by said reporting system to a remote system.

64. The system of claim 44, further comprising reporting the information that is communicated using said series of conductive elements to a remote system.

* * * * *

UNITED STATES PATENT AND TRADEMARK OFFICE
CERTIFICATE OF CORRECTION

PATENT NO. : 7,239,287 B2  
APPLICATION NO. : 10/422637  
DATED : July 3, 2007  
INVENTOR(S) : I. J. Forster Page 1 of 2

It is certified that error appears in the above-identified patent and that said Letters Patent is hereby corrected as shown below:

| COLUMN | LINE | |
|---|---|---|
| Title Page; (56) Pg. 1, col. 2 | Refs. Cited (U.S. Pats., Item 16) | "Otoole et al." should read --O'Toole et al.-- |
| (74) Pg. 1, col. 2 | Attorney, Agent, or Firm | "O'Connor;" should read --O'Connor-- |
| 6 | 7 | "cooper," should read --copper,-- |
| 6 | 29 | "(2) any" should read --(2) do not form any-- |
| 7 | 42 | "shape length 48" should read --shaped link 48-- |
| 8 | 20 | "conditions;" should read --conditions:-- |
| 10 | 28 | "lack thereof," should read --or lack thereof,-- |
| 11 | 34 | "conductor 14" should read --conductor 114-- |
| 13 | 23 | "the load, 80," should read --the load 80,-- |
| 13 | 28 | "couple, coupled, or coupling" should read --"couple," "coupled," or "coupling"-- |
| 13 | 29 | "Reactive coupling" should read --"Reactive coupling"-- |
| 18 (Claim 63, | 49 line 1) | "system" should read --method-- |

UNITED STATES PATENT AND TRADEMARK OFFICE
CERTIFICATE OF CORRECTION

PATENT NO. : 7,239,287 B2
APPLICATION NO. : 10/422637
DATED : July 3, 2007
INVENTOR(S) : I. J. Forster It is certified that error appears in the above-identified patent and that said Letters Patent is hereby corrected as shown below:

| COLUMN | LINE | | |
|---|---|---|---|
| 18 (Claim 63, | 51 line 2) | delete "force" | |
| 18 (Claim 64, | 53 line 1) | "system" should read --method-- | |

Signed and Sealed this

Eighth Day of September, 2009

David J. Kappos
*Director of the United States Patent and Trademark Office*